United States Patent [19]

Kokeguchi et al.

[11] 4,243,689

[45] Jan. 6, 1981

[54] NON-FRIED INSTANT COOKING DRY NOODLES AND A METHOD FOR PRODUCING SUCH NOODLES

[75] Inventors: Sadao Kokeguchi, Ibaragi; Hiroshi Takahashi, Suita; Ken Okada; Sanpei Murakami, both of Osaka, all of Japan

[73] Assignee: Kanebo Foods Ltd., Tokyo, Japan

[21] Appl. No.: 1,352

[22] Filed: Jan. 4, 1979

[30] Foreign Application Priority Data

Jan. 12, 1978 [JP] Japan .................................... 53/3063

[51] Int. Cl.$^3$ ................................................ A23L 1/16
[52] U.S. Cl. ..................................... 426/557; 426/242; 426/451; 426/511
[58] Field of Search ................. 426/557, 451, 242, 511

[56] References Cited

U.S. PATENT DOCUMENTS

| | | | |
|---|---|---|---|
| 2,037,042 | 4/1935 | Perewe | 426/557 |
| 2,677,613 | 5/1954 | Shiah | 426/557 |
| 3,718,480 | 2/1973 | Tremblay | 426/242 |
| 3,846,563 | 11/1974 | Cunningham | 426/557 |
| 4,098,906 | 7/1978 | Hisaki et al. | 426/557 |

*Primary Examiner*—Joseph M. Golian
*Assistant Examiner*—Elizabeth A. Hatcher
*Attorney, Agent, or Firm*—Cushman, Darby & Cushman

[57] ABSTRACT

Non-fried oil free instant cooking dry noodles are manufactured by preparing a mixture of raw noodle material containing at least 25% by weight of water by mixing, with substantially no kneading, components consisting mainly of wheat flour and water or additives; then rolling the mixture into a web form; thereafter with or without external application of water onto the surfaces of the web, steaming the web at gauge pressure of 0.5–1.5 kg/cm$^2$ for 2–5 minutes until the starch therein has an α-conversion degree of at least 98%; followed by preliminary heating preferably at 80°–110° C. for 2–5 minutes to adjust the water content to 15–35% by weight; then shaping the web into individual noodles; and then further drying these noddles at 55°–145° C. until the water content becomes 10% or smaller by weight. These dry noodles are not sticking to each other, have smooth surfaces and have fine porous texture, and are easily transformed to cooked state by immersion in hot water for a short time, giving good sense, feel and taste. Also, these dry noodles are stable and have good durability during storage of an extended period of time.

17 Claims, No Drawings

NON-FRIED INSTANT COOKING DRY NOODLES AND A METHOD FOR PRODUCING SUCH NOODLES

BACKGROUND OF THE INVENTION (a) Field of the Invention

The present invention relates to non-fried, oil-free instant cooking dry noodles, and more particularly it pertains to noodles of this type having elongated cord-like shape, which are free of stickiness and agglutination to each other and easily releasable from entanglement during the manufacturing process, whose surfaces are smooth with no blister-like bubble formations and which can be converted to satisfactory boiled condition in a very short period of time by immersion in hot water. The present invention further concerns a method for manufacturing such dry noodles.

(b) Description of the Prior Art

Known methods for manufacturing non-fried dry instant cooking noodles are such that one of them comprises the steps of adding water to starch components consisting mainly of wheat flour, uniformly distributing the added water throughout the starch components by kneading, subjecting the resulting mixture to rolling to provide a long web of raw starting materials, then cutting this web by a wave-shaped cutter blade into individual lengthy cord-like raw noodles, thereafter subjecting these noodles to steaming to effect α-conversion of the starch components, and then drying the resulting noodles. Another one of the known methods comprises extruding the above-said mixture under pressure to provide a long web of raw starting material, and then subjecting this web to same steps as mentioned above. Still another one of the known methods comprises directly extruding said mixture through a die to provide individual elongated cord-like raw noodles, thereafter subjecting these noodles to the steps mentioned above. These known methods have the disadvantages and inconveniences such that the elongated individual cord-like raw noodles obtained are not of a straight form but they are waved or crimped in configuration, and that these noodles become swollen during the step of steaming, causing the individual noodles to stick to each other, so that α-conversion of the starch components does not take place uniformly throughout the noodles, which in turn leads to the inconvenience that the final dry product noodles would not be uniformly rendered to the boiled or cooked state when immersed in hot water, thus failing to give such satisfactory feel, sense and taste as would be expected of cooked or boiled noodles. Especially, those product dry noodles which are manufactured by extrusion of said mixture into a web of starting material, and those product dry noodles which are manufactured by direct extrusion of said mixture into individual cord-like noodles, both invariably experience the undesirable consequence that the mixture is subjected to excessive kneading during the extrusion, so that the texture of the raw material is rendered excessively dense, lowering the ability of the product dry noodles to be transformed to satisfactory cooked or boiled state when immersed in hot water for a short period of time, and the sense, feel and taste, including what is called "al dente" noted at the time these noodles are eaten become very poor. It is to be understood that the description used hereinafter for evaluation of the cooked noodles include this "al dente".

Also, there is known a method proposed to improve the above-said disadvantages and inconveniences of the prior art, which comprises mixing starch components which consist mainly of wheat flour with an emulsion of an oil-in-water phase edible oil, subjecting the resulting raw mixture to steaming, and thereafter drying same. The individual pieces of raw noodles produced according to this known method are such that said edible oil is scattered non-uniformly on the surfaces of the individual noodles, and accordingly it is not possible to completely eliminate the mutual sticking between individual cord-like noodles which takes place during the step of steaming, so that there is required an additional step of releasing the mutually contacting noodles apart from each other. Moreover, when the product dry noodles are subjected to cooking by immersion in hot water, there still remains a sense and feel of wheat flour when eaten, which are caused by the inevitable non-uniform α-conversion during the manufacturing process due to the application of the emulsion before steaming, and also caused by insufficient ability for being rendered to the boiled or cooked state within a short period of time. These facts lead to lowering of the sense, feel and taste when the cooked noodles are eaten, which represent lowering of the value as product dry noodles and leaves much to be improved.

As a means of solving those problems stated above of the prior art, there is disclosed in U.S. Pat. No. 4,098,906 a method for manufacturing non-fried dry instant cooking noodles, which comprises application of an aqueous emulsion of edible oil to the surfaces of shaped elongated raw pieces of noodles, and then subjecting these noodles to steaming to thereby prevent mutual sticking of the individual noodles and to accelerate α-conversion of the starch components during a short period of time, and thereafter dehydrating and evaporating the moisture contained in the noodles in a drying step to expand the surfaces of the noodles to make these surfaces porous and to produce very fine pores communicating with the inner portions or texture of the noodles, whereby the product dry noodles can be rendered to the boiled or cooked state in a short period of time, and the cooked noodles give satisfactory sense, feel and taste when eaten. According to this known technique, there can be provided non-fried instant cooking dry noodles which are lower in the number of individual noodles sticking to each other. Since, however, an aqueous emulsion of edible oil is applied to the surfaces of the shaped noodles during the course of manufacture, there cannot be avoided degradation of the quality of the product dry noodles with lapse of time, though the speed of degradation of quality is improved when compared with that of fried dry noodles. As such, there has been a demand for the development of technique which satisfies this requirement of long stable durability of quality of the product, resisting a long period of storage.

The inventors, therefore, have made strenuous research and many experiments to improve the foregoing problems encountered in the prior art, and as a result they have worked out the present invention based on the discovery that, by first forming a mixture of grain flour consisting mainly of wheat flour and water, then rolling this mixture material into a long web of an appropriate thickness containing at least 25% by weight of water, or by forming said mixture and subjecting same to extrusion under pressure to provide a web of raw noodle material having the same water content as that mentioned above, thereafter either subjecting the web directly to steaming for α-conversion of the starch components, or first applying water to the surfaces of the raw web and then steaming the resulting web for α-conversion, thereafter subjecting the resulting web to a preliminary drying to regulate the water content to 15-35% by weight, then cutting the web into shaped individual noodles, and lastly drying them to produce the final dry product. According to the method of the present invention, there are provided the advantages that, even when the web of raw material become swollen as α-conversion progresses during the steaming step, there arises no sticking of the noodle material as encountered in the prior art, owing to the fact that the web has not been shaped into individual cord-like pieces of noodle, and thus this α-conversion can progress uniformly throughout the web, and there develop no blister-like formation in the surfaces of the web. Besides, after said steaming step, the web is subjected to a preliminary drying, so that the web can be cut into individual pieces of noodle without the accompaniment of sticking to the cutter blade and without requiring such troublesome step of releasing the entangled pieces of noodles as has been needed in the prior art. Thus, there can be obtained the product dry noodles having a uniform breadth or size. These shaped noodles are further subjected to drying, by which step is produced porous texture which is peculiar to dry noodles intended for instant cooking. The product noodles of the present invention which are thus produced can be rendered quickly to the edible cooked or boiled state by immersion in hot water during a very short period of time, giving such satisfactory sense, taste and feel as expected of cooked noodles, and have an outstanding durability during storage for an extended length of time.

Briefly speaking, the present invention provides non-fried, oil free instant cooking dry noodles and a method therefor which comprises, after application of water, as required depending on cases, to the surfaces of a web of raw noodle material which already contains at least 25% by weight of water, the web is subjected to steaming, and thereafter the web is subjected to a preliminary drying step to reduce the water content of the web to 15-35% by weight, and then cutting the web into noodle shape, and then drying the resulting noodles.

Here, the technique disclosed in said U.S. Pat. No. 4,098,906 will be compared with the technique of the present invention. The feature of this U.S. Patent is found in the process of a series of steps that, after formation of individual pieces of raw noodles, an aqueous emulsion of edible oil is applied to the surfaces of these noodles, and then they are steamed, and thereafter the resulting noodles are dried. By the application of an aqueous emulsion of edible oil to the surfaces of the shaped noodles prior to being steamed, the occurrence of mutual sticking of individual noodles is eliminated. However, the edible oil employed in the aqueous emulsion which is applied to the surfaces of raw noodles causes progressive degradation of quality of the noodles as time passes. Thus, a solution of this problem has been desired. In good contrast thereto, the feature of the present invention lies in that said application of such edible oil to the surfaces of raw noodles is entirely omitted to thereby eliminate the cause for quality degradation with time, and that, in place of this omission of emulsion-applying step, the order of manufacturing steps is changed. That is, the web of raw noodle material prior to being shaped into individual pieces of noodles is subjected to steaming, and then same is subjected to a preliminary drying to supress the occurrence of stickiness in the noodle material of the web, and thereafter the resulting web is cut to be shaped appropriately into individual pieces of noodle. Whereby, the troubles encountered in the prior art which are represented by the mutual sticking of these noodles and also by the sticking of the raw noodles to the cutter blade are prevented. Thus, the product which is obtained according to the present invention is superior in durability during storage for an extended period of time.

SUMMARY OF THE INVENTION

It is, therefore, a primary object of the present invention to provide non-fried, oil-free instant cooking dry noodles and a method therefor which solve the disadvantages, inconveniences and problems mentioned above of the prior art and which eliminate the occurrence of mutual sticking and agglutination of shaped noodles during the manufacturing process.

Another object of the present invention is to provide dry noodles of the type described above and a method therefor, which noodles are such that the product noodles have smooth surfaces with substantially no blister-like formations.

Still another object of the present invention is to provide dry noodles of the type described above and a method therefor, which noodles are such that they can be transformed quickly to cooked or boiled condition by immersion in hot water, and which give a satisfactory sense, feel and taste when eaten.

A further object of the present invention is to provide noodles of the type described above and a method therefor, which noodles have durability in storage for an extended period of time without deterioration of the quality of the product dry noodles.

These and other objects, the advantages as well as the features of the present invention will become apparent by reading the following detailed description.

DETAILED DESCRIPTION OF THE PREFERRED EMBODIMENTS

Hereunder will be described some preferred embodiments of the present invention.

It should be understood also that the terms "web of raw noodle material" used in the present invention is made of a starting material of starch components consisting mainly of wheat flour, or is made of such starch components mentioned above and added with an appropriate amount of yolk of eggs, and contains at least 25%, preferably 33-45%, by weight of water relative to the weight of the starch components contained in the web, and this web is formed either by mixing the components while avoiding as much as possible the occurrence that the components become kneaded during such mixing, and thereafter subjecting the mixture to rolling (this type of web will hereinafter be referred to as rolled web), or by passing said mixture of noodle components through, for example, an extruder while being kneaded therein under pressure (this type of web will hereinafter to be referred to as pressure-extruded web), and in each instance the web produced has a thickness of 2 mm or less usually. It should be understood that the web of raw noodle material may contain a known improving agent for noodles such as di-sodium phosphate, an additive for foodstuff such as glycerin monostearate and a seasoning agent such as "kansui" which is an agent for increasing the viscosity of noodles and is an extract of banana and Taiwan plantain and is an aqueous solution containing potassium carbonate, sodium carbonate, potassium phosphate and sodium phosphate. This web of noodle material preferably contains, uniformly dispersed therein, sodium chloride in an amount 0.5–8.0% by weight relative to the weight of the starch components before being steamed. This sodium chloride is included for the following two purposes, one of which is for improving the ability of the product dry noodles to transform to the edible boiled or cooked state when immersed in hot water, and the other is for giving a taste to the noodles. In case the content of the sodium chloride is in excess of 8.0% by weight, the product noodles will become too salty and are not good in terms of quality, and also the gluten structure of the noodle material will be serverd apart, making it difficult to form a web of noodle material. In case the sodium chloride content is less than 0.5% by weight, the product dry noodles may not be transformed satisfactorily to the edible cooked or boiled state, and the product noodles will not give a good taste when eaten. Also, it has been found that, among the above said two types of webs of noodle material, the rolled web has a porous texture having finer pores in a greater number as compared with the pressure-extruded web, and that accordingly the product dry noodles made of said rolled web are more quickly rendered to edible boiled or cooked state when immersed in hot water and give better sense, feel and taste when eaten as compared with those product dry noodles made from the pressure-extruded web. Thus, the use of rolled web is preferred. Also, the web of noodle material may be added with a viscous binder such as egg yolk or gum component as an additive intended for increasing the viscosity of the components contained in the web. Such additive has the effect of preventing the occurrence of blister-like bubble-formations in the surfaces of the web during steaming, and has the effect of decreasing the water content of the web in the state that such blister-like formations are avoided. It should be understood that said improving agent for noodles concurrently serving as a food additive which are employed in the present invention is one selected from the group consisting of di-sodium phosphate; glycerin monostearate; "kansui" (which is an aqueous solution containing potassium carbonate, sodium carbonate, potassium phosphate and sodium phosphate and which increases the viscosity of noodles); a surface active agent including glycerin fatty acid ester, sucrose fatty acid ester, sorbitan fatty acid ester and lecithin; a moistening agent including phopylene glycol and D-sorbitol; and other agents including sodium starch phosphate, sodium caseinate, L-lysine hydrochloride, vitamin $B_1$, vitamin $B_2$, chlorella and active gluten. Said viscous binder is one selected from the group consisting of egg yolk and a water-soluble gum including cellulose sodium glycolate, sodium polyacrylate and sodium alginate. Said seasoning agent includes various spices, various extracts, sodium glutaminate, sodium inosinate, guanylic acid and succinic acid. In case the water content of the web is less than 25% by weight relative to the weight of the starch components contained in the web, the distribution of both water and air in the material of the web becomes non-uniform, and the viscosity of the constituent components becomes markedly lowered, whereby the web is rendered to a powdery state. Thus, in the subsequent steaming stage which will be described later, uniform swelling will not develop as the α-conversion of the starch components makes progress, so that blister-like bubble formation will develop in the surfaces of the web, causing the surfaces to lack smoothness. As a result, the final product dry noodles will develop, when immersed in hot water, scraping and cracking of the body of web, thus lowering the sense, feel and taste of the cooked noodles when eaten.

Next, the manufacturing process according to the present invention will be described in detail.

As the first step, the web of raw noodle material is subjected to direct steaming to cause α-conversion of the starch components, or alternatively, water is applied to the surfaces of the web as that water is carried there in an amount up to 100% by weight at most, preferably 10–50% by weight, relative to the weight of the web. Thereafter, the water-applied web is subjected to steaming for causing α-conversion of the starch components. It should be noted that, in case the amount of the applied water adhering to the surfaces of the web is in excess of 100% by weight, the web will develop excessive swelling during the steaming step, so that non-uniform α-conversion will take place, bringing about the undesirable result that uneven drying occurs in the web during the drying step, and the sense, feel and taste of the cooked noodles will tend to become poor. As the means of applying water to the surfaces of the web, there may be performed spraying of water by means of a spray gun, or water may be sprinkled onto the web by a shower system, or the web may be immersed in water.

As stated, the application of water onto the surfaces of the web will cause more uniform progress of α-conversion at the time of steaming, so that there can be obtained product dry noodles which are satisfactory in their ability of being rendered to edible cooked or boiled condition when immersed in hot water and also in their sense, feel and taste when eaten.

For the purpose of steaming, any known conditions for steaming conventional web of noodle material may be employed. However, it is desirable to bring the web into contact with steam under a gauge pressure of 0.5–1.5 kg/cm$^2$, preferably 0.7–1.2 kg/cm$^2$, for a length of time of about 2–5 minutes. This steaming is performed until the starch components have an α-conversion degree of at least 93%. After this steaming step, the web is subjected to a preliminary drying step during which the water content of the web is regulated to 15–35% by weight, preferably 18–30% by weight. The conditions for the preliminary drying step are not definitely defined, since the conditions depend on the temperature employed and also on the duration of this step. Usually, however, the temperature employed is 110° C. at the highest, and preferably it is 80°–100° C. The length of time of this step is the shorter the better, and it is desirable to perform this step for a period of 2–5 minutes usually. In case the water content of the web decreases below 15% by weight, there could occur scorching of web during the preliminary drying step. Along therewith, at the time the preliminarily dried web is cut by a cutter blade into cord-like noodles of an appropriate diameter or breadth, the web would tend to break, and it would be hard to obtain uniform individual shaped noodles. Also, in case the water content of the web is in excess of 35% by weight, the web tends to stick to the cutter blade at the time the web is cut. Accordingly, there will develop mutual sticking between the individual cord-like pieces of noodles obtained from the web. This will lead to the fact that, during the subsequent drying step, those portions of adjacent pieces of noodles which are sticking to each other would not be sufficiently dried, and furthermore no sufficient expansion takes place in such portions. Thus, these portions will exhibit non-uniform porous texture, greatly lowering the ability of the product dry noodles to be rendered quickly to edible boiled or cooked state when immersed in hot water, making the sense, feel and taste of the cooked noodles poor. After said preliminary drying step, the resulting web is cut into shaped noodles of about 10 mm at most in diameter or breadth. Thereafter, the individual noodles are dried, and thus product dry noodles are obtained. Cutting of the web may be carried out by the use of any known noodle cutter having a straight cutting edge or a wave-shaped cutting edge, or by the use of a slit cutter.

As stated above, it should be understood that, under the above-mentioned conditions, by cutting the web of noodle material after the web has been subjected to a preliminary drying step to obtain shaped individual noodles, it is possible to provide uniform individual noodles which are free of mutual sticking between the noodles, requiring no subsequent step of releasing the entangled noodles. The noodles thus obtained will exhibit uniform fine porous texture during the subsequent drying step, so that it is possible to obtain product dry noodles for instant cooking which are satisfactory in their ability of being transformed to edible boiled or cooked state when immersed in hot water and which are very good in sense, feel and taste when eaten. This is one of the features of the present invention.

As briefly referred to above, the drying conditions for individual noodles cannot be definitely defined, since these conditions will vary depending on the temperature employed and also on the length of time of the final drying step. In case, however, there is no need to expand the individual shaped noodles for the purpose of producing porous texture, it is desirable to dry these noodles usually at a temperature of 55°–110° C. for 10–40 minutes. In case there is the need to expand the individual noodles during the drying step, it is desirable to dry these noodles usually at a temperature of 115°–145° C. for 3–20 minutes. In each instance, drying is continued until the water content of the noodles reaches 10% or less by weight relative to the weight of the noodles thus dried. The drying may be conducted by the use of heated air, or by heating with infrared ray irradiation, heating by microwaves, and like heating either independently or in their combination. Same can apply also to the preliminary drying step.

As stated above, according to the method of the present invention, there is used no edible oil throughout the manufacturing process, so that the product dry noodles have an excellent stable durability, resisting the storage for an extended period of time. Also, by the regulation of the water content of the web of noodle material, the web can be made to swell and α-conversion can be made smoothly during the steaming step without causing any blister-like bubble formations in the surfaces of the web. Thereafter, by regulating the water content of the steamed web during the preliminary drying step, there can be completely avoided the occurrence of mutual sticking between individual noodles as they are cut from a web, thus eliminating an additional step of releasing the otherwise entangled cluster of noodles, and making it possible to easily obtain uniform individual noodles. Then, by subjecting these noodles to further drying during the final drying step, it is possible to obtain non-fried, oil-free instant cooking dry noodles having uniform specific porous texture which is peculiar to instant cooking dry noodles. Therefore, the dry noodles according to the present invention can be transformed easily to the edible boiled state by immersion in hot water for a very short period of time, and furthermore a very good sense, feel and taste can be obtained from these noodles in their edible state. In addition, according to the method of the present invention, the temperature employed for the final drying step may be appropriately varied, so that the degree of the porous texture can be freely selected or adjusted as desired. For this reason, it is possible to apply the method of the present invention also to the manufacture of instant-cooking dry noodle-like foods such as flat ribbon-like ones called "kishimen" and rod-like buckwheat food called "soba", so that these dry instant cooking foods can be rendered readily to an edible boiled or cooked state by immersion in hot water like these dry noodles mentioned above. Thus, the method of the present invention has an extensive utility, and the product manufactured according to this method can enjoy a very high commercial value.

Description will hereunder be made of some preferred examples of the present invention. It should be understood that in these examples, the terms "part" signifies a part by weight, and the term "%" means percent by weight. Evaluation of the sense, feel and taste of the cooked noodles, rating of blister-like bubble formations produced in the surfaces of the web of raw material, rating of the degree of inter-noodle sticking, rating of α-conversion, water absorbability, transparency of the hot water after dry noodles are immersed therein, determination of POV (peroxide value), COV (carbonyl value) and AV (acid value) are conducted in the manner as stated below.

(1) Evaluation of sense, feel and taste 70 g of dry noodles are placed in a heat-resistant cup, followed by pouring therein 400 cc of hot water at 90° C., and leaving them to stand for 3 minutes. At the end of 3 minutes, the noodles thus cooked are evaluated by a panel of 20 persons. The evaluation points are as follows: 10 (very good); 8 (good); 6 (normal); 4 (poor); and 2 (very poor). These points are shown by the mean values (decimals of over 0.5 inclusive are raised to the next higher number and the rest are ignored). The items relating to the evaluation of the cooked or edible-state noodles when eaten show the number of persons among the 20 person panel who indicate their feeling after eating the edible-state samples. The external appearance of the dry noodles (in the state of molded product) is evaluated by gross examination (observation with one's eyes) and the degree is indicated by these persons of the panel.

(2) Rating of blister-like bubble-formation in the surfaces of web

Webs of raw noodle material are steamed, and thereafter measured grossly of the number of blister-like bubble-formations of 1 mm or greater in breadth for an area of 10 cm² of the steamed web. The value representing the number is shown.

(3) Rating of the degree of sticking between noodles

A web is cut into individual raw noodles by a cutter blade having a straight cutting edge. The number of the raw noodles which have developed sticking or agglutination between them per 20 g of specimen noodles consisting of about 200 individual cords is measured and the value thereof is indicated.

(4) Degree of α-conversion (determined by enzyme process)

Fried instant cooking noodles are degreased with ethyl ether at 50° C. or lower and then more than 20 g of such, oil-free noodles are pulverized. For the non-fried noodles, more than 20 g of such noodles are directly pulverized. Fine powders having a grain size of less than 100 mesh are used. In the measurement, 5 conical flasks of 100 ml are used with respect to one sample and these flasks are referred to as $A_1$–$A_4$ and B. 1.00 g of the above described adjusted sample is respectively weighed and placed in the $A_1$–$A_4$ flasks. The tolerance of the weighed amounts in the four flasks is made to be within ±5%. 50 ml of water is added to each of the five flasks and among them, $A_1$ and $A_2$ are heated and boiled for 15 minutes and then quenched to room temperature in ice water.

On the other hand, to $A_1$, $A_3$ and B is added 5 ml of 5% aqueous diastase solution respectively and all the 5 flasks are kept at 37° C.±1° C. for 90 minutes while shaking, in a thermostat containing water, after which 2 ml of 1 N HCl is added to all the flasks to stop the diastase reaction and the content in each flask is transferred into a 100 ml flask and water is added thereto 100 ml. Each solution is filtered by means of a dry filter paper, and from the filtrates obtained from the flasks $A_1$–$A_4$ and B, 10 ml of filtrate is fed into a conical flask with a ground stopper by a pipette, and said filtrates are referred to as $a_1$–$a_4$ and b.

In this stage, a conical flask with ground stopper containing 10 ml of water taken up by a pipette is prepared separately for a blank test. 10 ml of N/10 aqueous solution of iodine is added to each of a total of 6 flasks.

Then 18 ml of N/10 aqueous solution of sodium hydroxide is added to each of the 6 flasks one after another at a same time interval by means of a stop watch and the flask is corked and shaken and then left to stand precisely for 15 minutes. When the first flask has stood for 15 minutes, 2 ml of 10% sulfuric acid is added to the flask in the same order and the same interval as when N/10 aqueous solution of sodium hydroxide was first added, rapidly as soon as the stopper is opened, and these solutions are titrated with N/10 aqueous solution of sodium thiosulfate, and the titrated values of $a_1$–$a_4$ and b are referred to as $P_1$–$P_4$ and Q and the titrated value of the blank test is referred to as r. α-conversion degree (%) is determined by the following formula:

$$\alpha\text{-conversion degree} = \frac{(r - P_3) - (r - P_4) - (r - Q)}{(r - P_1) - (r - P_2) - (r - Q)} \times 100$$

(5) Water absorbability

Determination of water absorbability is conducted in accordance with the following procedure.
i. 1000 cc of water is placed in a pan of 2000 cc.
ii. the water in this pan is confirmed of its boiling state.
iii. dry samples having a weight $V_D$ in dry state are weighed for 400 g.
iv. sample of (iii) is placed in the pan of (ii). Whereupon, the time required for the sample to be transformed to edible boiled state is measured by a stop watch.
v. at the end of 5 minutes of said transformation, the hot water is removed through a mesh sieve, and the residual sample is left to stand for 1 minute to dehydrate the water adhering to the surfaces of sample.
vi. water-absorbed sample $V_w$ are weighed for 400 g.
vii. water absorbability is calculated by the following formula:

$$\text{water absorbability} = \frac{\text{weight after absorbing water } (V_W) - \text{weight after dehydration } (V_D)}{\text{weight after dehydration } (V_D)}$$

(6) Transparency of water after immersion of noodles 60 g of sample for measurement is placed in a breaker of 500 cc, and 400 cc of hot water is poured therein. Transparency of the supernatant liquid skimmed from the resulting water at the end of 3 minutes is measured by a transparency tester.

(7) POV (peroxide value)

For sample added with potassium iodide, the isolated free iodine is titrated with a standard solution of sodium thiosulfate, and milli-equivalent of consumed sodium thiosulfate per 1 kg of sample is obtained:

$$POV = \frac{(A - B) \times F}{C} \times 10$$

wherein:
A represents the amount (ml) of N/100 sodium thiosulfate standard solution used in the test;
B represents the amount (ml) of N/100 sodium thiosulfate standard solution used in the bland test;
F represents the factor of N/100 sodium thiosulfate standard solution; and
C represents the amount (g) of sample used.

(8) COV (carbonyl value)

tample is dissolved in benzene. Then, the resulting solution is reacted against a solution of 4-DNPH in benezene and against a solution of trichloroacetic acid in benzene. Thereafter, the resulting solution is added with a solution of potassium hydroxide in alcohol for color development. Light-absorbancy at such time is measured:

$$COV = \frac{Q}{0.854 \times W} \times 1000$$

wherein:
Q represents light-absorbancy; and W represents the amount (mg) of oil collected from sample.

(9) AV (acid value)

Amoung (mg) of potassium hydroxide required for neutralizing free fatty acid contained in sample:

$$AV = \frac{5.611 \times A \times F}{B}$$

wherein:
A represents the amount (ml) of the stnadard solution of N/10 alcoholic potash;
F represents the factor of the standard solution of N/10 alcoholic potash; and
B represents the amount (g) of sample used.

EXAMPLE 1

To 500 parts of wheat flour was added a mixed solution of 175 parts of water, 10 parts of sodium chloride and 1 part of a solution of "kansui" composition. After stirring the mixture in a mixer for achieving sufficient mixing without causing any kneading, the resulting mixture was rolled to a thickness of 1.2 mm by rollers, and thus a web of raw noodle material was obtained.

This web (686 parts) was sprayed uniformly with water by a spray gun, to cause water to be carried on the surfaces of this web in an amout 30% relative to the original weight of the web. The resulting web was steamed at a gauge pressure of 1.0 kg/cm² for 2 minutes, followed by preliminary drying for 3 minutes by heated air at 90° C. which was passed at the speed of 15 m/sec., thereby adjusting the water content of the web to 25%. Thereafter, the web was cut, by means of No. 20 cutter having a straight cutting edge, into individual raw noodles of 1.5 mm in breadth. These noodles were further dried by hot air at a temperature of 100° C. with an air speed of 20 m/sec until the water content of these noodles became 7% to obtain the instant cooking dry noodles of the present invention.

EXAMPLE 2

The procedure similar to Example 1 was carried out to obtain instant cooking dry noodles of the present invention excepting that the surfaces of the web of raw noodle material were not applied with water.

EXAMPLE 3

The procedure similar to Example 1 was carried out to obtain instant cooking dry noodles of the present invention excepting that the web was prepared by the use of a pressure-extruder in place of rollers.

EXAMPLE 4

The procedure similar to Example 2 was carried out to obtain instant cooking dry noodles excepting that the web was prepared by the use of a pressure-extruder.

CONTROL 1

In the procedure of Example 1, the steaming step was omitted, and thus instant cooking dry noodles were obtained.

CONTROL 2

In the procedure of Example 1, the preliminary drying step was omitted, to obtain instant cooking dry noodles.

CONTROL 3

The web of Example 1 was used. This web was cut into individual raw noodles of 1.5 mm in breadth by the use of No. 20 cutter having a wave-like cutting edge. Thereafter, these noodles were steamed for 2 minutes at a gauge pressure of 1.0 kg/cm², followed by drying these steamed noodles by hot air at 100° C. at an air speed of 20 m/sec until the water content of the noodles became 7%, and thus instant cooking dry noodles were obtained.

CONTROL 4

The procedure similar to Control 3 was carried out to obtain instant cooking dry noodles excepting that the web of raw noodles material of Example 3 was used.

CONTROL 5

The procedure similar to Control 3 was carried out excepting that a mixture material having the same composition as that of the web of Example 1 was directly extruded through a die to obtain raw noodles of straight cord shape of 1.5 mm in breadth and 1.2 mm in thickness and having a rectangular cross section.

CONTROL 6

The procedure similar to Control 3 was followed to obtain instant cooking dry noodles excepting the use of a web of raw noodle material of 1.2 mm in thickness which was prepared by mixing 500 parts of wheat flour with 1 part of solution of the "kansui" composition, 10 parts of sodium chloride, 175 parts of water and 83 parts of aqueous emulsion of an edible oil consisting of 900 parts of water, 100 parts of salad oil and 2 parts of an ester of saccharose and palmitinic acid, and then molded by rollers.

With respect to the instant cooking dry noodles obtained in Examples 1–4 and Controls 1–6, evaluation ws made of the sense, feel and taste of the transformed (cooked) noodles when eaten, and determination was made of the degree of blister-like bubble-formations in the surfaces of the webs of raw noodle material, and of the degree of sticking between individual noodles. The result is shown in Table 1.

TABLE 1

|  | Examples |  |  |  | Controls |  |  |  |  |  |
|---|---|---|---|---|---|---|---|---|---|---|
|  | 1 | 2 | 3 | 4 | 1 | 2 | 3 | 4 | 5 | 6 |
| No. of blister-like formations (No. of persons) | 0 | 0 | 0 | 0 | 0 | 0 | 0 | 0 | 0 | 0 |
| No. of mutually sticking noodles: |  |  |  |  |  |  |  |  |  |  |
| 2 | 0 | 0 | 0 | 0 | 0 | 14 | 22 | 21 | 18 | 8 |
| 4 | 0 | 0 | 0 | 0 | 0 | 8 | 14 | 8 | 14 | 4 |
| over 6 | 0 | 0 | 0 | 0 | 0 | 5 | 9 | 11 | 12 | 5 |
| Appearance of noodles (how well molded) | G | G | G | G | SP | P | P | P | P | SP |
| Stick to teeth " | 0 | 0 | 1 | 1 | 18 | 6 | 3 | 10 | 10 | 1 |
| Short of resiliency " | 0 | 1 | 0 | 0 | 16 | 11 | 8 | 0 | 0 | 13 |
| Excessive resiliency " | 0 | 0 | 1 | 3 | 0 | 0 | 0 | 12 | 14 | 0 |
| Short of smoothness " | 0 | 0 | 0 | 0 | 14 | 5 | 10 | 0 | 0 | 9 |
| Excessively smooth " | 0 | 0 | 0 | 1 | 0 | 0 | 0 | 0 | 1 | 0 |
| Feel like raw wheat flour " | 0 | 0 | 0 | 0 | 20 | 9 | 3 | 6 | 8 | 11 |
| Evaluation when eaten (points) | 10 | 9 | 9 | 8 | 2 | 4 | 4 | 3 | 2 | 3 |

Note:
G represents Good.
SP represents Slightly Poor.
Represents Poor.

As will be clear from the result shown above, the products of the present invention obtained in Examples 1–4 were found to be superior to Controls 1–6 with respect to the degree of sticking between noodles, the ability of dry noodles to transform to cooked state when immersed in hot water, and the sense, feel and taste of the cooked noodles when eaten.

CONTROL 7

Same web of raw noodle material as that of Example 1 was shaped, by No. 20 cutter having a straight cutting edge, into individual raw noodles of 1.5 mm in breadth. To these raw noodles (686 parts) was uniformly sprayed by a spray gun a solution of emulsion consisting of 900 parts of water, 100 parts of salad oil and 2 parts of ester of saccharose and a high molecular fatty acid. The amount of this emulsion adhering to the surfaces of the raw noodles was 30%. Based on the absolute weight of the noodles, 2.1% of salad oil, 20.8% of water, and 0.04% of the ester of saccharose and palmitinic acid serving as the emulsion adhered to the surfaces. Thereafter, the resulting raw noodles were steamed for 2 minutes at a gauge pressure of 1.0 kg/cm$^2$, and then the steamed noodles were dried by hot air at 100° C. at an air speed of 20 m/sec until the water content of the raw noodles became 7%. Thus, porous instant cooking dry noodles having fine pores were obtained.

Next, quality of the products of Examples 1-2 (the present invention) and of Control 7 was evaluated at the time immediately after manufacture and at the end of 6 months. The result of evaluation is shown in Table 2.

TABLE 2

| Cooked noodles | Example 1 Immediately after production | Example 1 At end of 6 months | Example 2 Immediately after production | Example 2 At end of 6 months | Control 7 Immediately after production | Control 7 At end of 6 months |
|---|---|---|---|---|---|---|
| Excessively smooth (No. of persons) | 0 | 0 | 0 | 0 | 1 | 1 |
| Short of smoothness | | | | | | |
| " | 0 | 1 | 0 | 0 | 0 | 0 |
| Cut well by teeth | | | | | | |
| " | 0 | 0 | 0 | 0 | 0 | 0 |
| Cut poorly by teeth | | | | | | |
| " | 0 | 0 | 0 | 0 | 0 | 1 |
| Feel like raw wheat flour | 0 | 0 | 1 | 2 | 0 | 0 |
| " | | | | | | |
| Oily odor | | | | | | |
| " | 0 | 0 | 0 | 0 | 0 | 3 |
| Evaluation when eaten (point) | 10 | 9 | 9 | 9 | 9 | 8 |
| α-conversion degree (%) | 96.8 | 96.1 | 93.7 | 93.0 | 96.1 | 95.4 |
| Water absorbability (%) | 128 | 126 | 120 | 118 | 118 | 115 |
| Amount of edible oil (%) | 0 | 0 | 0 | 0 | 0.78 | 0.78 |
| Amount of emulsion (%) | 0 | 0 | 0 | 0 | 0.03 | 0.03 |
| Transparency thru hot water after immersion (cm) | 6.5 | 6.5 | 6.5 | 6.5 | 2.0 | 2.0 |
| POV | 4.1 | 8.3 | 4.0 | 8.5 | 11.2 | 52.1 |
| COV | 6.3 | 9.1 | 6.4 | 9.4 | 18.2 | 32.3 |
| AV | 0.3 | 0.4 | 0.3 | 0.42 | 0.9 | 1.85 |
| Overall evaluation (points) | 10 | 9 | 9 | 8 | 8 | 7 |

As will be apparent from the result shown above, Examples 1-2 (the present invention) were found to be superior to Control 7 (non-fried instant cooking dry noodles obtained by spraying an aqueous emulsion of edible oil onto the surfaces of raw noodles) with respect to POV, COV and AV which are indice of degradation of quality, and the durability in storage for an extended period of time.

EXAMPLE 5

The procedure similar to Example 1 was carried out excepting that the water content of the web of raw noodle material was changed to the value shown in Table 3. The result of evaluation of the product is shown in Table 3.

TABLE 3

| | Water content of raw web (%) | | | | | | |
|---|---|---|---|---|---|---|---|
| | 25 | 28 | 30 | 33 | 35 | 40 | 45 |
| No. of blister-like formations in surfaces of web: | 84 | 22 | 0 | 0 | 0 | 0 | 0 |
| No. of mutually sticking noodles: | | | | | | | |
| 2 | 0 | 0 | 0 | 0 | 0 | 0 | 0 |
| 4 | 0 | 0 | 0 | 0 | 0 | 0 | 0 |
| over 6 | 0 | 0 | 0 | 0 | 0 | 0 | 0 |
| Appearance of noodles (how well molded) | P | G | G | G | G | G | G |
| Stick to teeth (No. of persons) | 13 | 16 | 0 | 0 | 0 | 0 | 0 |
| Short of resiliency | | | | | | | |
| " | 13 | 11 | 0 | 0 | 0 | 0 | 0 |
| Excessive resiliency | | | | | | | |
| " | 2 | 0 | 2 | 0 | 1 | 0 | 0 |
| Short of smoothness | 18 | 15 | 4 | 0 | 0 | 0 | 0 |
| " | | | | | | | |
| Excessively smooth | | | | | | | |
| " | 0 | 0 | 0 | 0 | 0 | 1 | 2 |
| Feel like raw wheat flour | 16 | 3 | 0 | 0 | 0 | 0 | 0 |
| " | | | | | | | |
| Evaluation when eaten (points) | 3 | 4 | 8 | 10 | 9 | 9 | 9 |

Note:
G represents Good.
P represents Poor.

EXAMPLE 6

The procedure similar to Example 1 was carried out excepting that the starting mixture of Example 1 further contains 25 parts of egg yolk and that the water content of the web of raw noodle material is changed to that shown in Table 4. The result of evaluation of this Example is shown in Table 4.

TABLE 4

| | Water content of raw web (%) | | | | |
|---|---|---|---|---|---|
| | 20 | 23 | 25 | 30 | 40 |
| No. of blister-like formations in surfaces of raw web | 49 | 18 | 0 | 0 | 0 |
| No. of mutually sticking noodles: | | | | | |
| 2 | 0 | 0 | 0 | 0 | 0 |
| 4 | 0 | 0 | 0 | 0 | 0 |
| over 6 | 0 | 0 | 0 | 0 | 0 |
| Appearance of noodles (how well molded) | P | G | G | G | G |
| Stick to teeth (No. of persons) | 13 | 10 | 0 | 0 | 0 |
| Short of resiliency " | 11 | 8 | 0 | 0 | 0 |
| Excessive resiliency " | 1 | 0 | 2 | 0 | 0 |
| Short of smoothness " | 18 | 6 | 2 | 1 | 0 |
| Excessively smooth " | 0 | 0 | 0 | 0 | 1 |
| Feel like raw wheat flour " | 18 | 10 | 0 | 0 | 0 |
| Evaluation when eaten (points) | 3 | 5 | 8 | 9 | 9 |

Note:
G represents Good.
P represents Poor.

From the result shown above, it was found that, even when the water content of web of raw noodles material was lowered to 25%, a desirable result was obtained.

EXAMPLE 7

The procedure similar to Example 1 was carried out excepting that the water content of the web after preliminary drying was adjusted as shown in Table 5 by changing the length of time of the preliminary drying step. The result is shown in Table 5.

TABLE 5

| | Water content after preliminary drying (%) | | | | | |
|---|---|---|---|---|---|---|
| | 5 | 10 | 15 | 25 | 30 | 40 |
| No. of blister-like formation in surfaces of raw web | 0 | 0 | 0 | 0 | 0 | 0 |
| No. of mutually sticking noodles: | | | | | | |
| 2 | 0 | 0 | 0 | 0 | 0 | 21 |
| 4 | 0 | 0 | 0 | 0 | 0 | 10 |
| over 6 | 0 | 0 | 0 | 0 | 0 | 8 |
| Appearance of noodles (how well molded) | P | P | G | G | G | P |
| Stick to teeth (No. of persons) | 0 | 0 | 0 | 0 | 0 | 9 |
| Short of resiliency " | 2 | 0 | 0 | 0 | 0 | 0 |
| Excessive resiliency " | 10 | 7 | 10 | 0 | 1 | 6 |
| Short of smoothmess " | 6 | 3 | 0 | 0 | 0 | 0 |
| Excessively smooth " | 0 | 0 | 0 | 0 | 3 | 10 |
| Feel like raw wheat flour " | 0 | 0 | 0 | 0 | 0 | 0 |
| Evaluation when eaten (points) | 2 | 4 | 9 | 10 | 8 | 4 |

Note:
G represents Good.
P represents Poor.

As will be clear from the result shown above, the water content of the web after preliminary drying is required to be adjusted to 15-35% by weight, preferably 18-30% by weight.

As stated above, according to the present invention, there is first prepared a web of raw noodle material containing at least 25% by weight of water. With or without external application of water to the surfaces of this web, the web itself is steamed, so that there is caused no such sticking between individual noodles as encountered in the prior art in which the raw web is cut into noodles. The steamed web is subjected to preliminary drying to adjust the water content to 15-35% by weight, and then the web is shaped into individual noodles, and thus mutual sticking of noodles is avoided. These noodles are further dried to provide final product until the water content becomes 10% or smaller by weight. Thus, the product dry noodles contain no mutually sticking portions and no blister-like bubble-formations in the surfaces of noodles. When immersed in hot water, the dry noodles are easily transformed into edible cooked or boiled state within a short period of time, and give good feel, sense and taste to their eater. Besides, these dry noodles stand stable for long-term storage. As such, the method of the present invention is industrially quite useful and can be effectively applied to many kinds of instant foods.

What is claimed is:

1. A method of manufacturing non-fried oil-free instant cooking dry noodles, comprising the steps of:
    (a) preparing a mixture of raw noodle material consisting essentially of at least one starch-containing component comprised mainly of wheat flour and having a water content of at least 25% by weight relative to the weight of the starch-containing component while avoiding to the extent possible kneading the mixture during mixing,
    (b) forming the mixture of step (a) into a web,
    (c) steaming said web until said starch therein has an $\alpha$-conversion degree of at least 93% as measured by the diastase enzyme process,
    (d) subjecting the steamed web to preliminary drying to adjust the water content of said web to 15-35% by weight,
    (e) shaping said web into individual noodles, and then
    (f) further drying said individual noodles until the water content of said noodles is reduced to at most 10% by weight relative to the weight of the noodles thus dried.

2. A method according to claim 1, in which said web of raw noodle material is prepared by rolling the mixture of said material.

3. A method according to claim 1, in which said web of raw noodle material is prepared by extruding the mixture of said material.

4. A method according to claim 1, further comprising the step of externally applying water to the surfaces of said web of raw noodle material prior to the web being subject to said steaming step (c).

5. A method according to claim 4, in which said application of water causes the surfaces of said web to carry water thereon in an amount not exceeding 100% by weight relative to the weight of said web.

6. A method according to claim 1, in which said raw noodle material contains sodium chloride in an amount of 0.5-8.0% by weight relative to the weight of the starch-containing component.

7. A method according to claim 1, in which said steaming is carried out at a gauge pressure 0.5–1.5 kg/cm² until said degree of of α-conversion is achieved.

8. A method according to claim 1, in which said preliminary drying step (d) is performed at a temperature up to 110° C. until said water content of said web is reduced to 15–35% by weight relative to the weight of the web.

9. A method according to claim 1, in which said further drying step (f) is carried out at a temperature of 55°–145° C. until the water content of the noodles is reduced to about 10% or less by weight relative to the weight of these noodles.

10. A method according to claim 1, in which said preliminary drying step (d) and said further drying step (f) are performed by hot air heating, infrared heating, microwave heating, or combinations thereof.

11. A method according to claim 1, in which the water content of said mixture of step (a) is between 25 and 45% by weight relative to the weight of the starch-containing component.

12. Non-fried oil-free instant cooking dry noodles having water content of 10% or less by weight, and consisting essentially of at least one starch-containing component comprised mainly of wheat flour, the starch contained therein having an α-conversion degree of at least about 93% as measured by the diastase enzyme process, said noodles having a fine porous texture providing communication between the external surfaces of said noodles with the interior portions thereof by a network of fine pores, and being capable of transformation into an edible cooked or boiled state within a short period of time when immersed in hot water of 90° C. or lower, said noodles having non-coated smooth surfaces substantially devoid of blister-like bubble-formations, said noodles being sufficiently durable to withstand storage for at least 6 months without substantial change in quality, devoid of portions sticking to adjacent noodles, and yielding a non-sticky good sense, feel and taste when transformed to said edible cooked state and produced by the method of claim 8.

13. Non-fried oil-free instant cooking dry noodles according to claim 12, in which said noodles contain sodium chloride in an amount of 0.5–8% by weight based on the weight of said starch-containing component.

14. Non-fried oil-free instant cooking dry noodles according to claim 12 or 13, in which said noodles contain an effective amount of at least one of an improving agent for noodles, a seasoning agent, and a viscous binding agent.

15. Non-fried oil-free instant cooking dry noodles according to claim 12 or 13, in which the noodles contain an improving agent selected from the group consisting of di-sodium phosphate, glycerin monostearate, potassium carbonate, sodium carbonate, potassium phosphate, sodium phosphate, glycerin fatty acid ester, sucrose fatty acid ester, sorbitan fatty acid ester, lecithin, propylene glycol, D-sorbitol, sodium starch phosphate, sodium caseinate, L-lysine hydrochloride, vitamin $B_1$, vitamin $B_2$, chlorella, active gluten, and combinations thereof.

16. Non-fried oil-free instant cooking dry noodles according to claim 12 or 13 in which the noodles contain a viscous binder selected from the group consisting of egg yolk, water-soluble gums, cellulose sodium glycolate, sodium polyacrylate, sodium alginate, and combinations thereof.

17. Non-fried oil-free instant cooking dry noodles according to claim 12 or 13 in which the noodles contain a seasoning agent selected from the group consisting of spices, extracts, sodium glutaminate, sodium inosinate, guanylic acid, succinic acid, and combinations thereof.

* * * * *